M. RÜPING.
WOODEN DOWEL.
APPLICATION FILED MAR. 2, 1915.
1,229,528.
Patented June 12, 1917.
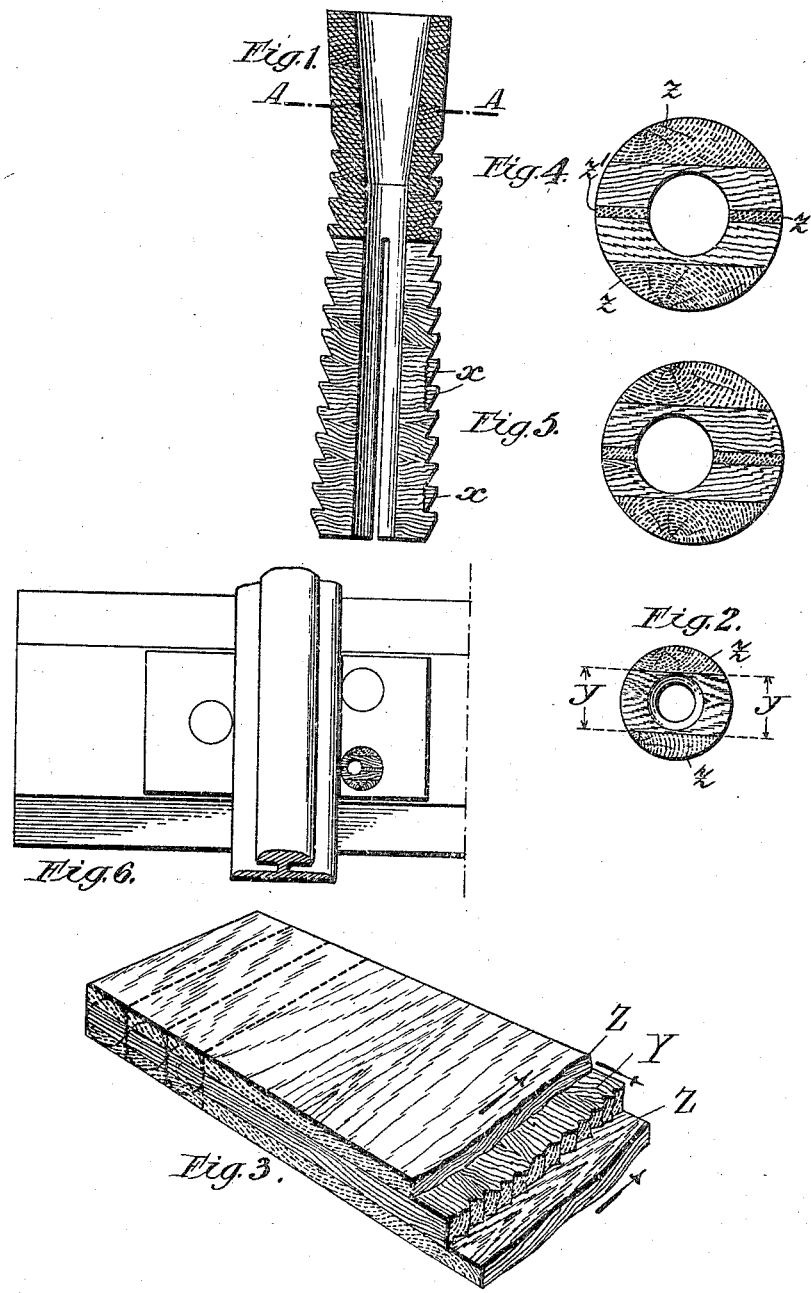

UNITED STATES PATENT OFFICE.

MAX RÜPING, OF BERLIN, GERMANY.

WOODEN DOWEL.

1,229,528.  Specification of Letters Patent.  Patented June 12, 1917.

Application filed March 2, 1915. Serial No. 11,522.

*To all whom it may concern:*

Be it known that I, MAX RÜPING, manufacturer, a subject of the German Emperor, and resident of Lessingstrasse 1, in Berlin, Germany, have invented new and useful Improvements in Wooden Dowels, of which the following is a specification.

The present invention relates to a new wooden dowel. Wooden dowels, hitherto, have been made in such a manner that the fibers of the wood ran longitudinally to the dowel. With such dowels the screw-spike screwed into the dowel or the ordinary spike driven into the dowel are seated in the latter as if driven into cross grained wood, which, as is well known, is neither favorable for screws nor for nails, and less satisfactory than as if the screw or nail were secured at right angles to the direction of the fibers of the wood. In the latter case the threads of the screw will be parallel to the fibers of the wood. They will, therefore, merely force the fibers aside, without cutting them. If, however, the screw thread cuts into the dowel in such a manner, that the axis of the screw is parallel to the direction of the fibers, the screw threads will, when screwed into the wood, cut the fibers and in consequence thereof the strength with which the screws are held by the self-cut threads against being drawn out, is comparatively small, in particular when the screw has been unscrewed and rescrewed several times. The same is the case with a nail which, as is well known, when driven into cross-grained wood, and extending longitudinally and parallel to the fibers, offers less resistance against being pulled out than a nail, which is driven transversely to the direction of the fibers.

The idea, on which the present invention is based, is this that the dowel is made in such a manner, that the fibers of the wood extend at right angles to the axis of the dowel.

The wooden dowels are generally provided on their outside with grooves or screw threads with which they engage in the bore-hole of the ties and the like. When the fibers run, as heretofore, longitudinally, the circumferential ribs, which are formed by the screw threads or the grooves, will very easily break off, as the wood fibers offer in their longitudinal direction very small resistance against shearing stresses.

All these disadvantages are obviated, if, according to the present invention, the fibers in the dowel are made to run, transversely to the longitudinal axis of the dowel. As a dowel, in which all wood fibers run transversely, that is at right angles to the axis of the dowel, hardly would withstand the strains as to bending and tensile stresses, and the forces produced by screwing or driving the dowel into the wood, it is advisable to compose the dowel partly of cross grained wood and partly of long grained wood.

The invention has, hereinafter, been described in a more detailed manner, reference being made to the accompanying drawing.

Figure 1 is a longitudinal section through a dowel embodying my invention.

Fig. 2 is a section on the line A—A in Fig. 1.

Fig. 3 illustrates the method of making the dowels.

Fig. 4 is a section through a different form of dowels.

Fig. 5 is a section through a modified form of the dowel.

Fig. 6 shows the use of such dowels.

The dowel according to the present invention may be made of any desired shape. With the form shown in Fig. 1 it is assumed that they are intended as railroad tie dowels, and that they are slotted from the bottom upward to about the middle; the dowel may also increase in diameter on the outside in a downward direction, the inner bore-hole being slightly tapered downward so that the spike screwed into it will cause the dowel, which has been previously driven into the tie, to spread and thereby take a more secure grip in the wood of the tie. The invention may be used in combination with any kind or shape of dowels; for instance the ribs may be substituted by screw threads, the slots may be omitted, the exterior face may be cylindrical throughout and so forth.

If we consider the dowel shown in Fig. 1 we will understand that the forces, tending to pull the dowel from the tie, will produce stresses, which tend to shear off the ribs of the tines or legs $a$ at the places indicated at $x$. When wood is used, in which the fibers extend longitudinally to the axis of the dowel, the individual ribs formed by the incisions will readily break off. It is entirely different if the dowel, as shown in Fig. 1, is made of wood, the fibers of which extend at right angles to the axis of the dowel. In this case the shearing stresses on the ribs must act at right angles to the longitudinal fiber, and this is well known to be the most favorable condition, under which wood may be subjected to any strains.

As shown in Fig. 2 the dowel according to Fig. 1 is composed of three separate sections, one central section $y$ and two outer sections $z$, $z$. Only the fibers of the central section $y$ extend at right angles to the axis of the dowel. The spike therefore is entirely surrounded by wood, the fibers of which are at right angles to the axis. On the outer circumference of the dowel only the parts of the ribs on the central section marked $y$ in Fig. 2 are subject to stresses in the manner indicated in Fig. 2. The other parts will, on the contrary be subjected to strains of the hitherto known kind and as described with reference to the former type of dowel pin in which the fibers extend longitudinally. The dowel may, however, be driven into the tie in such a manner, that the central section is at right angles to the direction of the rails and thus take up the lateral thrust, so that the spike is pressed against cross grained wood, and the wood of the dowel is subjected to a compression strain in the direction of its longitudinal fibers.

When the dowel is composed in the manner as indicated in Fig. 2, so that only the central section $y$—$y$ is composed of wood, the fibers of which run at right angles to the axis of the dowel, while in the sections $z$, $z$ the fibers extend in the usual manner parallel to the axis of the dowel, a dowel is obtained, which will have, in every respect the greatest strength. The parts $z$ will take up all bending stresses and the greater part of the tensile strains, to which the dowel is subjected.

The sections $z$ are joined to the section $y$ by means of a good glue, which is preferably made insoluble in water by any suitable, known process, or some special glue insoluble in water may be used.

Fig. 3 illustrates a convenient method of making the dowel. On a board Z, having a width equal to the length of the dowels to be made, and the fibers of which extend transversely to the length of the board, or which is composed of a number of pieces of board arranged beside each other, is glued a board Y, the fibers of which extend longitudinally to the board, and on this board Y is again glued a third board Z, the fibers of which extend, the same as with the first board, transversely to the length of the board. The direction of the fibers is indicated in Fig. 3 by means of arrows. After the glue has set the thus obtained compound board which is as wide as the dowels shall be long is cut into square prisms of the length of the dowels, as indicated by the dotted lines. From these prisms then, as also shown by dotted lines, the dowels are manufactured in the customary manner. The dowels may, of course, also be composed of more than three sections, and instead of the board Y, or the two boards Z, or of both, boards may be used which are each composed of several boards, the fibers of which extend at right angles to each other.

Such a dowel is shown in cross-section in Fig. 4. Besides the long grain sections at the sides $z$ there is another layer $z^1$. The long grain wood, which appears in the section as cross grain wood, is indicated by dotted lines, the cross grain wood, which appears in the section as long grain, is indicated by longitudinal lines.

The dowels may be impregnated in known manner and at the same time the glue may be made insoluble in water simultaneously with the impregnation. The dowels may also, and in particular the glue employed, be rendered antiseptic by a suitable treatment.

In Fig. 5, a different form of the dowel according to Fig. 4 is shown. The difference consists in that the bore is eccentric. This has the advantage, that such dowels can be inserted in the tie without the rail being previously removed, whereas dowels with a concentric bore-hole partly extend under the rail base, and therefore can not be inserted without the rail being removed. The dowel is inserted, as shown in Fig. 6, beside the rail in such a manner, that the bore-hole lies close to the base of the rail, and the spike will therefore be in its proper position.

I claim:

1. A wooden dowel composed of sections, the fibers of one section extending longitudinally to the dowel, the fibers of another section transversely to the dowel.

2. A wooden dowel composed of a plurality of sections, the fibers of adjacent sections running at right angles to each other whereby the fibers of alternate sections extend parallel to the axis of the dowel, and the fibers of the intermediate section extend at right angles to the axis of the dowel.

3. A wooden dowel composed of a plurality of sections, the section in which the bore-hole of the dowel is formed being essentially at right angles to the axis of the dowel, and the fibers of the adjacent sections extending essentially parallel to the axis of the dowel.

In testimony, that I claim the foregoing as my invention, I have signed my name in presence of two witnesses, this sixth day of February 1915.

MAX RÜPING.

Witnesses:
 EUGEN MEYER,
 WOLDEMAR HAUPT.